United States Patent Office 3,590,128
Patented June 29, 1971

3,590,128
ANIMAL VACCINES AND METHODS FOR USING SAME
Rene Norman Larose, Hartford, Conn., assignor to Arbor Acres Farm, Inc., Glastonbury, Conn.
No Drawing. Filed June 25, 1968, Ser. No. 739,622
Int. Cl. A61r 27/00
U.S. Cl. 424—89
24 Claims

ABSTRACT OF THE DISCLOSURE

Vaccine for use in immunizing poultry against lymphoid leukosis and erythroblastosis comprising a live lymphoid leukosis erythroblastosis causative virus and avian cell tissue. Methods for immunizing poultry and for obtaining a lymphoid leukosis erythroblastosis virus from a lymphoid leukosis virus by serially passing through live birds.

---

This invention relates to animal vaccines and more particularly to novel vaccines effective in immunizing poultry against avian leukosis and to the methods for so doing.

The poultry disease known as avian leukosis is a viral disease which causes widespread economic damage to commercial flocks. Early work on the disease tended merely toward observation of clinical symptoms without any significant attempts at differential diagnosis. As a result, a broad base syndrome generally involving any one or more of the viscera, blood cells, bone marrow and neurological organization was considered to be symptomatic of leukosis.

More recent thought on the subject, however, has fairly well demonstrated that avian leukosis is subdividable into at least two and possibly three or more discrete diseases, and this is generally subscribed to by investigators in the field. One of these diseases in Marek's disease, in which the major involvement is neurological in character and is manifested usually in lack of coordination with progressive paralysis of the extremities, notably the legs. General weakness and emaciation is an early clinical sign.

Another of the groups is lymphoid leukosis in which the symptomatology is generally manifested in gross lesions of the viscera, notably the liver, spleen and gonads. The lymphoid leukosis causative virus has a relatively long incubation period of the order of several months, usually four to eight months. Birds are susceptible from hatching, but clinical signs do not readily appear because of the long incubation period. The disease is usually caused by natural exposure in the field and is found in many species of birds such as chickens, turkeys, ducks, pheasant and the like. Prognosis is not good, mortality rates running, according to best estimate, at 10 to 30 percent of the total flock. A severe problem is the contagious nature of the disease and the likelihood of continual proliferation over long periods of time.

Clinical manifestations of lymphoid leukosis generally appear in the liver, which may be greatly enlarged, diffuse, or nodular; in the spleen, which may also be enlarged or nodular, and occasionally in the gonads. Kidney enlargement may also be observed.

Another manifestation of the diseases formerly classed in avian leukosis is erythroblastosis. The symptomatology of this affliction is generally inclusive of lymphoid leukosis, and often it is difficult to differentiate between them. Erythroblastosis is generally characterized, however, by the formation of blast cells in the blood and thus often times, but not necessarily, hematologic studies will demonstrate the disease. A major distinction, however, significant from an economic viewpoint, is that the incubation period of the causative agent of erythroblastosis is substantially shorter than that of the causative agent of lymphoid leukosis, being generally of the order of 2 to 16 weeks. Thus, the onset of the disease comes at a time when the birds are least able to resist it. This is probably due to a difference in pathogenic potency of the two agents. An erythroblastosis causative virus will produce lymphoid leukosis, but a lymphoid leukosis causative virus will not necessarily cause erythroblastosis.

A substantial volume of literature has been developed with respect to these diseases and with particular reference to the management and control thereof. The literature is consistent in the characterization of the diseases as extremely intractable. No prophylactic or therapeutic means have been devised for managing these diseases except possibly the ability of the farmer to maintain hygienic environments for their flocks. Prior to the present invention, there was no known technique for immunizing poultry against lymphoid leukosis or erythroblastosis, although various investigators have attempted to prepare vaccines. Whether the prior attempts were unsatisfactory because of the unavailability of a suitable vaccine system, a proper mode of administration or the like, is not clear. Some investigators have reported an immunity to transplants of infected cells but have consistently reported a lack of immunity to the virus itself.

The present invention is concerned with providing a vaccine which will combat both lymphoid leukosis and erythroblastosis, the preparation of the vaccine and its mode of use. The vaccine of the present invention comprises a live, non-attenuated lymphoid leukosis erythroblastosis virus in the presence of comminuted avian tissue cells infected with said virus in a suitable liquid, preferably aqueous, medium. The species of avian tissue cells preferably corresponds to the species of bird to be immunized. The vaccine is preferably in parenterally administrable form.

The vaccine of the invention may be prepared in a number of ways. Since, as indicated above, it is a live virus vaccine wherein the virus is a lymphoid leukosis erythroblastosis causing agent, the virus may be obtained by necropsy of an infected bird and selection and excision of the infected organs. Diagnosis can be made on the basis of gross examination, history of the flock and histopathological examination and where erythroblastosis is diagnosed, the desired organism will be available in the infected bird. On the other hand, lymphoid leukosis erythroblastosis causative viruses have been described in the literature and are available from one of the culture collections in which they are deposited.

Oftentimes, field isolates of virus cause only lymphoid leukosis and not erythroblastosis. Such viruses can be used to prepare the vaccine of the invention but only after a serial passage through a bird, the purpose of which is to intensify the antigenicity and pathogenicity of the virus to the point where it becomes erythroblastosis causative. This constitutes another aspect of the invention and will be described in more detail hereinafter.

PREPARATION OF THE VACCINE

Birds are selected from a flock in which lymphoid leukosis erythroblastosis is suspected. Fresh carcasses of sacrificed or naturally killed birds which are affected are disected and the infected viscera, e.g., the liver, spleen, kidney or gonads, but preferably the liver or spleen, removed. If the diagnosis of erythroblastosis is confirmed as by gross pathology, flock history, and histopathological examination, for example, the infected organs are comminuted and homogenized and suspended in a suitable liquid medium. If lymphoid leukosis rather than lymphoid leukosis erythroblastosis is diagnosed, then a lymphoid leukosis erythroblastosis causative virus can be obtained by rapid serial passage of the lymphoid leukosis virus through live birds as more fully described hereinafter. Suitable liquid media include any pharmaceutically acceptable diluent such as water, saline, tryptose-phosphate broth, Simms-Sanders solution and the like. Alternatively, when it is desired to store the virus-cell tissue homogenizate, prior to preparation of the vaccine, the homogenizate can be kept at liquid nitrogen temperature for long periods of time with only a small amount of loss of virus viability.

The homogenized cell blend so prepared is a mixture of viable virus with the avian cell tissue from the infected organ. It has been found that the relative proportion of virus to cell tissue obtained from the viscera of a bird succumbing to lymphoid leukosis erythroblastosis is quite adequate in terms of antigenicity to form the vaccine of the invention. Because of the nature of the virus, however, i.e., the fact that live cells, however small in terms of volume, will continually cause the virus to proliferate, even a small amount of avian cell tissue will suffice. Thus, the supernatant from a centrifuged virus-cell tissue suspension will be suitable herein. It is preferred, however, not to separate any cell tissue from the virus suspension.

The vaccine itself, in liquid suspension form may be fairly dilute and is preferably so. Suspensions ranging from 1 gm. virus-cell tissue mixture per 10–2,000,000 ml., preferably 25–100,000 ml. and most preferably 100–50,000 ml. of liquid diluent may be encountered depending on the dosage, the age of the bird being inoculated, the total amount of liquid needed to introduce efficacious amounts and the like.

As stated, the liquid may be water only or saline solution. It is preferred, however, to use a nutrient medium such as the standard tryptose-phosphate broth or Simms-Sanders solution, both of which are well known and readily prepared.

Additionally, it is preferred to include within the inoculum an effective amount of a bacteriastat such as penicillin, streptomycin or the like to prevent introduction of bacterial infection into the birds to be immunized.

IMMUNIZATION

Once prepared in liquid form, the inoculum is ready for use in immunizing the flock. Although, as previously stated, prior attempts have been made at providing immunization against lymphoid leukosis and erythroblastosis, it appears on the basis of the present work that a major factor contributing to the lack of success of such prior work has been a lack of recognition of a proper immunization technique. It has now been discovered that in order to obtain the necessary immunity in treated poultry, the bird must not be inoculated at a point in its development where it is unable to distinguish, from a physiological standpoint, the presence of foreign bodies within itself. This has reference to the bird's ability to form antibodies via commencement of the bird's rejection system. Thus, for example, very young birds are unable to distinguish the foreign matter from their own physiology because their rejection mechanism is not sufficiently organized. Antibodies are therefore apparently not formed. In chickens and turkeys this critical period appears to exist for at least two weeks after hatching, changing gradually during the third week to the point where they can be safely inoculated. Inoculation can be performed during the third week of life, but it is preferred to inoculate the birds after the third week, preferably between the third and twentieth weeks, most preferably at between six to sixteen weeks of age. Inoculation can be effected intraperitoneally or subcutaneously, as for example by wing web administration. As an added feature of the present invention, birds immunized in accordance with the present invention pass on parental immunity via egg transmission to their progeny, thus providing a natural immunity in chicks during the period in which they are otherwise most susceptible.

As to the amount of inoculum used, a volume of 1 cc. is conveniently handled and tolerated by the birds, especially when the route of administration is intraperitoneal. An efficacious amount of virus-cell tissue is represented by that which is an infective but sublethal dose. The actual number of cells needed to do this will vary depending on the age of the bird. A lethal dose for a three-week-old bird is not necessarily lethal for a bird sixteen weeks old, for example, and the titres may be adjusted accordingly. In general, however, speaking now of 1 cc. of an inoculum prepared from homogenized erythroblastosis infected organs as above described, suspensions containing 1 gm. of homogenizate with from 1000 to 10,000 ml. of liquid are sub-lethal for chickens six weeks or older and are infective. The number of tissue cells in such an inoculum generally runs from 3 to $30 \cdot 10^4$/ml. Since the number of cells will vary depending on the age of the bird, the amount of cells present in the the homogenizate, the degree of viability of the virus and the like, it is not possible to set forth all of the possible combinations. It is a relatively simple matter, however, for those skilled in the art, to determine a suitable sub-lethal dose if it is desired to use variable different from those set forth. Additionally, cell counts can be varied as desired when different volumes of inoculum are used. For example, when a wing web route is used, much lower volumes are encountered, generally around .005–.015 ml. Appropriate adjustments in concentration of the inoculum can be made in such cases.

Additionally, it is preferred to follow up the first inoculation with a booster shot preferably 3 to 6 weeks after the first inoculation. This is ordinarily done with an inoculum more concentrated than the first. It has been found that 1 cc. of a 1 gm./50 ml. dilution produced suitable results intraperitoneally. It is to be noted that oftentimes, depending on the age of the bird and previous exposure, such an inoculum would ordinarily have been lethal to the chickens were it not for the first inoculation. A suitable gauge for deciding the strength of the booster inoculum is the select a titre as concentrated as the first inoculation and preferably more concentrated. Concentrations of from 1–200 times that of the first inoculation are suitable.

The above description has been given with reference to preparing a vaccine from the organs of birds infected with lymphoid leukosis erythroblastosis. It may happen in actual practice that the particular outbreak in the field is lymphoid leukosis and not erythroblastosis.

In such a case, and this represents an additionally preferred aspect, the infected viscera and virus is serially passed through other birds until the pathogenicity is intensified to the point of being erythroblastosis causative.

As previously stated, erythroblastosis can be diagnosed on the basis of gross pathology and flock history. The short incubation time of the causative virus coupled with the presence of symptoms of lymphoid leukosis, is generally a suitable indication of the disease. Since the lymphoid leukosis erythroblastosis causative virus, in this aspect of the invention, is obtained from intensification of a naturally occurring lymphoid leukosis causative virus, by serial passage through other birds, rather than by field isolation, a prompt means has been devised to provide a gauge for measuring when a suitable, preferred virus has been produced. This is done for convenience and rapidity and avoids the time-consuming field trials otherwise necessary as will become apparent.

This intensification of lymphoid leukosis causative virus by serial passage through birds will ultimately produce a lymphoid leukosis erythroblastosis causative virus which can then be used to prepared the vaccine of the invention. All one need do is examine inoculated birds as the passage program progresses until birds affected with lymphoid leukosis erythroblastosis are obtained. The vaccine may then be prepared as above described. The time saving gauge, however, involves the use of a $CLD_{90}$ factor which as used herein has reference to the pathogenicity of 0.25 cc. of 1 gm. of virus-cell mixture per 5 ml. of liquid based on total volume of inoculum sufficient to kill within a ten-day period 90% of chicks inoculated at one day of age. The chicks used are preferably, though not necessarily, of the type bred for susceptibility to leukosis. Such a line of chickens is represented by the Cornell-S-line breed readily available commercially.

The preferred manner of producing the intensified virus is to prepare a virus-cell homogenizate from the infected organs, preferably the liver, of a lymphoid leukosis-infected bird, chicken for example. Inoculum is prepared therefrom by suspension in a suitable liquid medium at a concentration which is conveniently administered by injection, usually 1 gm. of virus-cell mixture per 2 to 10 ml. liquid. The inoculum is then administered intraperitoneally at a level of about 0.1 to 0.5 cc. to one-day-old chicks and the earliest mortality with gross lesions of lymphoid leukosis selected and used to prepare more inoculum. This serial passage procedure is repeated until an inoculum is obtained which kills at least 90% of day-old chicks within a 10-day period. The new inoculum prepared from the infected organs of such chicks then constitutes the vaccine.

The following examples illustrate preferred embodiments of the present invention.

Example I (a) Several white leghorn chickens were selected from a flock suspected of being infected with acute lymphoid leukosis. They were necropsied and the diagnosis confirmed. The infected livers, spleens and gonads were removed and homogenized in a ten Broeck 50 ml. tissue grinder. The ground cells were suspended in a tryptose-phosphate broth at a level of 1 gm. of cell-virus homogenizate per 4 ml. of broth. The broth was a standard TPB bacteriological culture broth containing the following: 20 g. Bacto-tryptose, 2 g. Bacto-dextrose, 5 g. NaCl, 2.5 g. Disodium phosphate, in one liter water.

One hundred thousand units of penicillin and 50 mg. of streptomycin were then added to kill any bacteria present, and the resulting inoculum used as described below.

(b) 0.25 cc. of the above inoculum was given intraperitoneally to one-day-old Cornell-S-line chicks, known to be susceptible to leukosis. The chicks were observed daily for mortality. The earliest mortality with gross lesions of lymphoid leukosis was selected and the infected viscera removed therefrom. These were used to prepare another inoculum as described in Step (a). The procedure of Step (b) was then repeated on groups of 25 to 50 one-day-old Cornell-S-line chicks until an inoculum was obtained which killed 90% of the treated chicks within a 10-day period, giving a lymphoid leukosis erythroblastosis causative virus. The virus was propagated by serial passage through one-day-old chicks at approximately 5-day intervals for a period of about one year and an inoculum prepared therefrom. Said inoculum was used in Step (c) below. Said virus, after further propagation at approximately 5-day intervals for a period of 8 months, has been deposited with the American Type Culture Collection, Rockville, Md., and bears the Accession No. ATCC VR 535 and is freely available to the public.

(c) A portion of the inoculum obtained in Step (b) above was diluted to 1 gm. of cells per 1000 ml. of TPB broth. This represented 40 $CLD_{50}$ per cc. per bird (one $CLD_{50}$ is the amount of inoculum which kills 50% of birds inoculated at one day of age within a 3-week period). One cc. thereof was used to inoculate intraperitoneally, each of 100 eighteen-week-old white leghorns. Four weeks later each of the birds received an inoculation of 1 cc. at a dilution of 1 gm. virus-cell tissue suspension per 50 ml. of TPB broth. This represented 250,000 $CLD_{50}$ per bird. All of the treated chickens were alive and healthy five weeks after the first inoculation with no clinical signs of lymphoid leukosis or erythroblastosis. Nine days after the second inoculation one bird died and postmortem examination indicated gross lesions of lymphoid leukosis erythroblastosis.

After 190 days, none of the 99 remaining treated birds showed any clinical signs of lymphoid leukosis; and all but two of the birds were alive and healthy. The two birds referred to died after about 150 days from causes unrelated to leukosis. One died from suffocation, the other from prolapse. Postmorten examinations of these birds showed no gross pathology of lymphoid leukosis.

(d) The immunity to lymphoid leukosis and erythroblastosis present in the treated hens is transmissible to their progeny thus providing a natural immunity to lymphoid leukosis and erythroblastosis during a period in the chicks' life when it is most susceptible. The following experiment demonstrates this effect. Repeated hatches of chicks from immunized and control groups of day-old white leghorn chicks were artifically challenged to determine resistance to lymphoid leukosis erythroblastosis. All chicks were from the same genetic lines and were all one-day old when challenged. Each chick was given an intraperitoneal injection of 0.25 cc. of the cell suspension described above at 1 gm./600,000 ml. liquid. The table summarizes the results obtained:

| Group-progeny of— | No. of birds challenged | Survival (No. of birds) | Percent survival |
|---|---|---|---|
| Trial 1: | | | |
| Immunized (a) | 96 | 74 | 77 |
| Control (b) | 81 | 28 | 35 |
| Trial 2: | | | |
| Immunized (a) | 356 | 284 | 80 |
| Control (b) | 252 | 150 | 60 |
| Trial 3: | | | |
| Immunized (a) | 38 | 23 | 60 |
| Control (b) | 35 | 12 | 34 |

As can be seen from the above, the progeny of the immunized hens were themselves much more resistant to direct challenge of lymphoid leukosis erythroblastosis virus than those of the control.

Example II

Twenty-five, 10-month-old white leghorns of a different genetic lines than those of Example I were given a 1 cc. intraperitoneal injection of a 1 gm./1000 ml. cellular-virus mixture prepared as described in Example I. This dosage amounted to 80 $CLD_{50}$ per bird. One bird died 11 days after administration. Postmortem examination showed gross lesions of lymphoid leukosis erythroblastosis. Four weeks after the first inoculation, the birds were re-inoculated with 1 cc. intraperitoneally of 1 gm./5 ml. cellular mixture which represented 8,000,000 $CLD_{50}$. The remaining 24 birds were alive and healthy after 210 days from the first inoculation with no signs of lymphoid leukosis erythroblastosis.

What is claimed is:

1. A vaccine for use in immunizing poultry against lymphoid leukosis and erythroblastosis which comprises a virus-cell mixture of a live lymphoid leukosis erythroblastosis causing virus intimately admixed with lymphoid leukosis erythroblastosis infected comminuted avian cell tissue in a pharmaceutically acceptable liquid medium wherein said virus-cell mixture is present at a level of 1 gm. thereof per 10–2,000,000 ml. of liquid.

2. The vaccine of claim 1 wherein the liquid is water.

3. The vaccine of claim 1 wherein the cell tissue is liver tissue.

4. The vaccine of claim 1 wherein the cell tissue is spleen tissue.

5. The vaccine of claim 1 wherein the cell tissue is kidney tissue.

6. The vaccine of claim 1 wherein the cell tissue is gonad tissue.

7. The vaccine of claim 1 wherein the liquid is water and the amount thereof per 1 gm. of said virus-cell mixture is from 25 to 100,000 ml.

8. The method for immunizing poultry against lymphoid leukosis and erythroblastosis which comprises administrating parenterally to a poultry host of at least two weeks of age, the antibody formation mechanism of which host is substantially developed, an infective, sub-lethal amount of a vaccine containing a virus-cell mixture comprising a live lymphoid leukosis erythroblastosis causing virus intimately admixed with lymphoid leukosis erythroblastosis infected comminuted avian cell tissue.

9. The method according to claim 8 wherein the avian cell tissue is derived from a species of birds which corresponds to the species of host being treated.

10. The method according to claim 9 wherein the vaccine is administered in the form of a liquid suspension thereof.

11. The method according to claim 10 wherein the suspension comprises water.

12. The method according to claim 11 wherein the suspension is administered subcutaneously.

13. The method according to claim 11 wherein the suspension is administered intraperitoneally.

14. The method according to claim 13 wherein said host is from 6 to 20 weeks of age at the time of said administration.

15. The method for improving the immunity against lymphoid leukosis and erythroblastosis of a poultry host previously immunized against lymphoid leukosis and erythroblastosis with a first inoculation in accordance with the method of claim 8, which comprises re-inoculating said host with a second inoculation after said first inoculation, said second inoculation comprising an effective amount of the virus-cell tissue mixture containing live lymphoid leukosis erythroblastosis causing virus intimately admixed with lymphoid leukosis erythroblastosis infected comminuted avian cell tissue.

16. The method of claim 15 wherein said second inoculation is administered within three to six weeks of said first inoculation.

17. The method according to claim 16 wherein said first and second inoculation are administered subcutaneously.

18. The method according to claim 16 wherein said first and second inoculation are administered intraperitoneally in the form of an aqueous suspension of said virus-cell tissue mixture.

19. The method for preparing a lymphoid leukosis and erythroblastosis vaccine which comprises serially passing a lymphoid leukosis causing virus intimately admixed with lymphoid leukosis infected comminuted avian cell tissue through live poultry by intraperitoneal injection until said lymphoid leukosis virus is intensified to lymphoid leukosis erythroblastosis pathogenicity, selecting from said poultry cell tissue infected with said lymphoid leukosis erythroblastosis causative virus, comminuting said cell tissue and suspending the comminuted cell tissue in a pharmaceutically acceptable liquid medium.

20. The method of claim 19 wherein the cell tissue is liver tissue.

21. The method of claim 19 wherein the cell tissue is spleen tissue.

22. The method of claim 19 wherein the cell tissue is gonad tissue.

23. The method of claim 19 wherein the cell tissue is kidney tissue.

24. The method of claim 19 wherein the liquid medium is water.

No references cited.

RICHARD L. HUFF, Primary Examiner